United States Patent [19]

Soucek et al.

[11] 3,884,310
[45] May 20, 1975

[54] WORKING AGGREGATE, MORE PARTICULARLY FOR SOIL CULTIVATION

[75] Inventors: Josef Soucek; Zdenek Brazda; Alexander Grecenko, all of Prague, Czechoslovakia

[73] Assignee: Vyzkumny ustav zemedelskych stroju, Prague, Czechoslovakia

[22] Filed: June 12, 1973

[21] Appl. No.: 369,220

[30] Foreign Application Priority Data
June 30, 1972 Czechoslovakia ................ 4688-72

[52] U.S. Cl. ................................ 172/292; 172/483
[51] Int. Cl. ............................................. A01b 51/00
[58] Field of Search ........... 172/292, 206, 212, 315, 172/324, 477, 204, 209, 210, 219, 605, 446, 281, 285, 476, 483, 281, 1; 37/129

[56] References Cited
UNITED STATES PATENTS

| | | | |
|---|---|---|---|
| 3,324,583 | 6/1967 | Harris | 172/292 X |
| 3,346,975 | 10/1967 | Lajoye | 37/129 X |
| 3,568,776 | 6/1968 | Vassberg | 172/281 X |
| 3,568,778 | 3/1971 | Swisher et al. | 172/292 X |
| 3,589,451 | 6/1971 | Wenzel | 172/285 |

Primary Examiner—Stephen C. Pellegrino
Attorney, Agent, or Firm—Burgess Ryan & Wayne

[57] ABSTRACT

The working aggregate comprises a working unit supporting working tools and suspended on lifting arms between a front and a rear power unit for swinging movement about vertical connecting pins. The working unit can be positively deflected in relation to the power units, to assume either a transport position in which all three units are in alignment, or a working position, in which the working unit is deflected sideways relative to the power units, to assume the required working width. Driving through curves are facilitated by a positively controlled turning mechanism arranged on the rear power unit. All members are adapted for remote control from the driver's seat on the front power unit.

9 Claims, 5 Drawing Figures

WORKING AGGREGATE, MORE PARTICULARLY FOR SOIL CULTIVATION

BACKGROUND OF THE INVENTION

The present invention relates to a working aggregate, more particularly for soil cultivation, which may be used for instance for plowing, stubble-plowing or for a complex preparation on seedbeds.

The growing shortage of agricultural workers, concentration of agricultural production and increase of cultivated areas render the demand for a substantial increase in the production of agricultural machinery and implements more and more imperative. New, highly efficient traction means and self-propelled machines are being introduced for this purpose. For soil cultivation and particularly for plowing operations, use is still made of conventional plows, drawn by tractors. Efforts to provide a self-propelled plowing unit have not yet yielded any practical results, as a result of the considerable increase in production costs and, moreover, the performance of such machines does not greatly differ from that of heavy plowing aggregates with multi-share plows, drawn by powerful tractors with an all wheel drive.

Prior proposals and designs have not led to an increased performance while keeping the increase of costs within reasonable limits.

SUMMARY OF THE INVENTION

An object of the invention is to obviate or mitigate the above disadvantages and to provide, moreover, numerous novel advantages and possibilities.

A further object of the invention is to improve the performance of agricultural and other machinery, in particular for soil cultivation, which as a result of achieved performance would meet the requirements of large agricultural establishments, while requiring a minimum of human labor.

Another object of the invention is to provide a working aggregate, in particular for soil cultivation, which would permit a substantially larger working width as well as working rate than is attained by the known plowing aggregates, while achieving a maximum utilization of the traction power of conventional high-performance traction means.

With these and other objects in view the device embodying the invention comprises a mounted working unit, such as a plow, suspended between a front power unit and rear power unit; due to the distribution of its weight, the working unit affects favorably the adhesion weight of both power units, which permits an easy and quick setting or deflection of the working unit either into a working position or transport position, in which the working aggregate is able to satisfy, as to its maximum width, the transport regulations governing transport on public communications.

In accordance with an aspect of the invention, the working unit is suspended between the front and rear power units by means of lifting arms and is provided in the front as well as in the rear part with at least one vertical connecting pin.

BRIEF DESCRIPTION OF THE DRAWINGS

A specific embodiment of the invention will now be described but merely by way of example, with reference to the accompanying drawings in which.

DESCRIPTION OF THE PREFERRED EMBODIMENT

Figure 1:
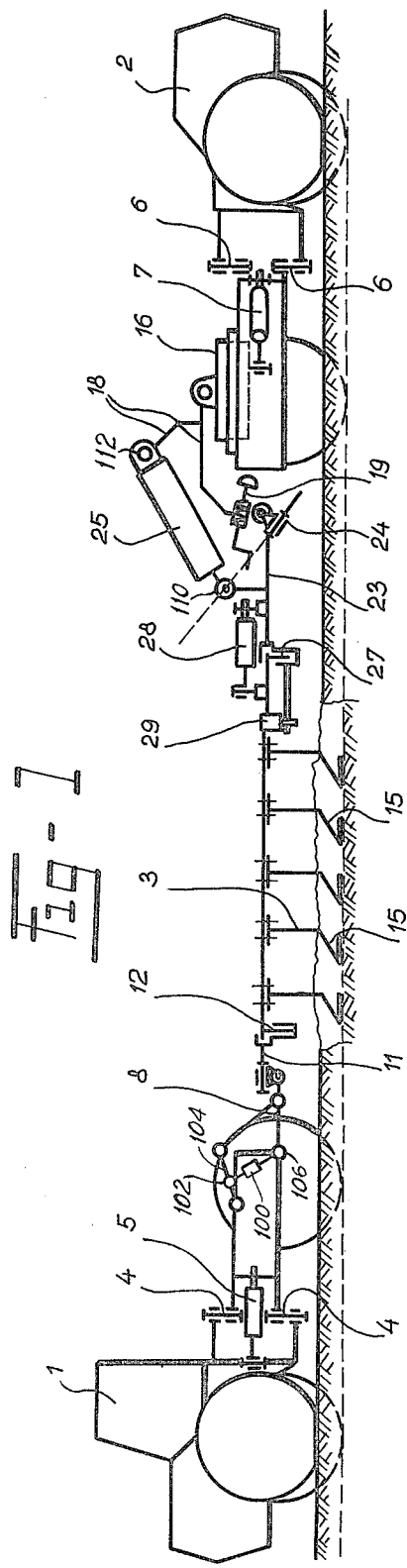
FIG. 1 shows in a side elevation view the working aggregate in its working position.

Referring to the drawings, it will be seen that the working aggregate comprises a front power unit 1, a rear power unit 2 and a working unit 3, suspended therebetween. The front power unit 1 consists of a wheeled tractor, preferably with an all-wheel drive. The steering means of the front power unit 1 comprises a rockable connection between the front and rear parts of said unit 1, whose vertical steering pivot 4 or two superposed vertical steering pivots 4 are placed between the front and rear axles of the power unit 1. The steering movement is effected by at least one, but preferably by two hydraulic cylinder and piston units 5, journalled between the front and rear part of the front power unit 1. The rear power unit 2 is likewise equipped with at least one vertical pivot 6, placed between its axles, but need not be provided with hydraulic cylinder and piston units 5 for steering purposes. The power unit 2 is however provided with at least one control cylinder and piston unit 7, whose mounting and purpose will be explained hereinafter.

The front power unit 1 has hydraulically controlled front lifting arms 8, carrying a front transverse lifting rod 9. On the latter, a longitudinal front pin 10 is mounted, to which a front yoke 11 is journalled. The yoke 11 is connected for swinging movement by means of a vertical connecting pin 12 with a main carrier 13 of the working unit 3. Between the front yoke 11 and the transverse lifting rod 9, a balancing spring 14, preferably a leaf spring, may be positioned. The working unit 3 carries working members or tools 15, such as plow bodies or other members, e.g., implements for the complex preparation of seedbeds. Front lifting arms 8 are hydraulically actuated as mentioned above. An example of a hydraulic arrangement useful in the present invention is shown in FIG. 1. More specifically, two hydraulic cylinders 100 (only one shown) are mounted on either side of the front power unit 1. Each cylinder 100 is journaled at point 102 to rotatable arm 104. The hydraulic cylinders are further journaled at point 106 to rotatable arm 8. As can be quite clearly seen in both FIGS. 1 and 2, extension of hydraulic cylinder 100 will force arm 104 upwardly, thereby lifting arm 8 to lift the entire working unit at the front power unit 1.

Fitted on the frame of the rear power unit 2 is a turntable 16, to which at least one control cylinder and piston unit 7 is journalled with one end, e.g., with its piston rod, its other end being pivoted to the frame of the rear power unit 2. The turntable 16 is equipped with connecting eyes 17, by means of which it is rockably attached to a rear lifting arm 18. Between the frame of the rear power unit 2 and the rear lifting arm 18 at least one abutment 19 is provided, which may be adjustable, for instance, by means of a screw with a crank 20. In the lower bifurcated part 32 of the rear lifting arm 18 a rear transverse rod 21 is positioned. Pivoted to said rod 21 by means of a rear yoke 22 is an implement holder 23. This pivoting connection is effected by a longitudinal inclined pin 24.

Figure 2:
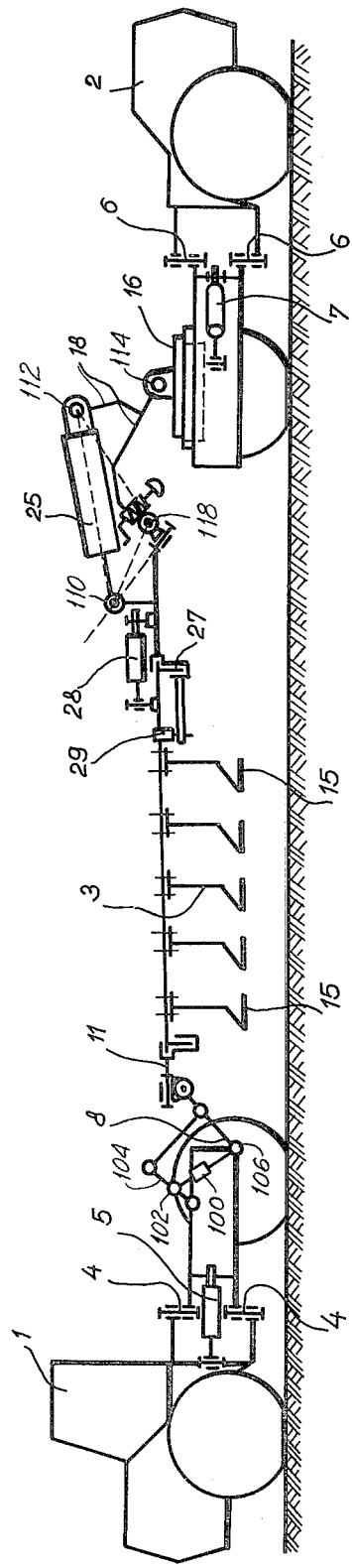
FIG. 2 is a corresponding view of the working aggregate in a transport position.
Figure 3:
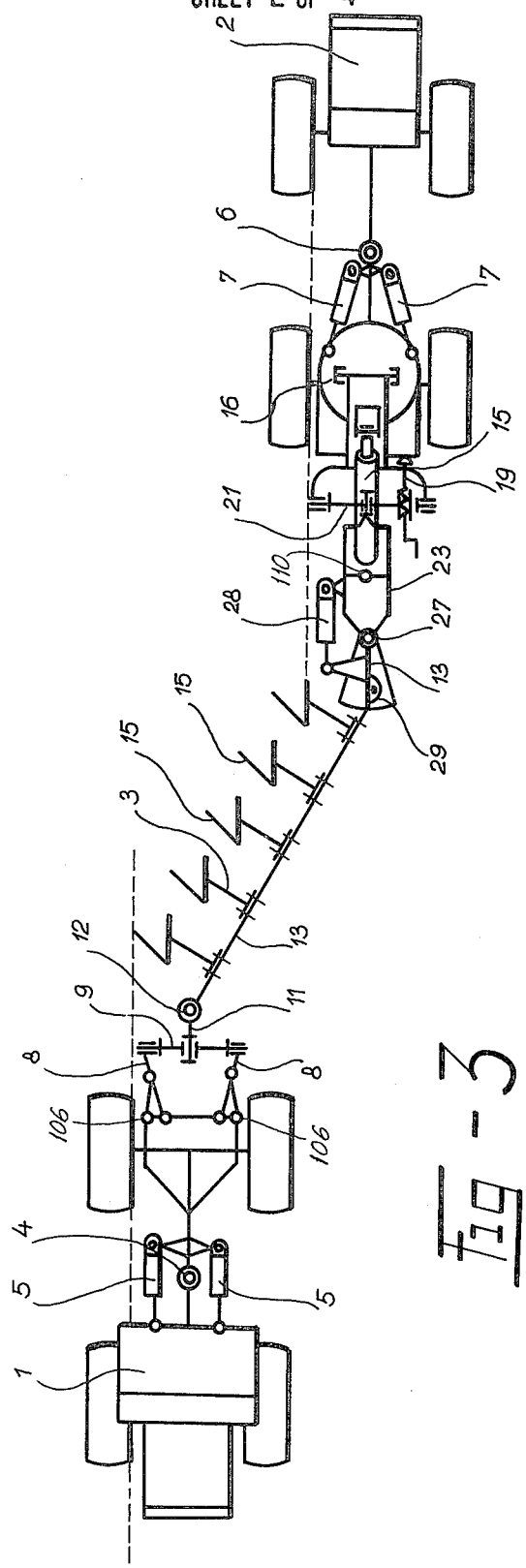
FIG. 3 is a plan view corresponding to FIG. 1.
Figure 4:
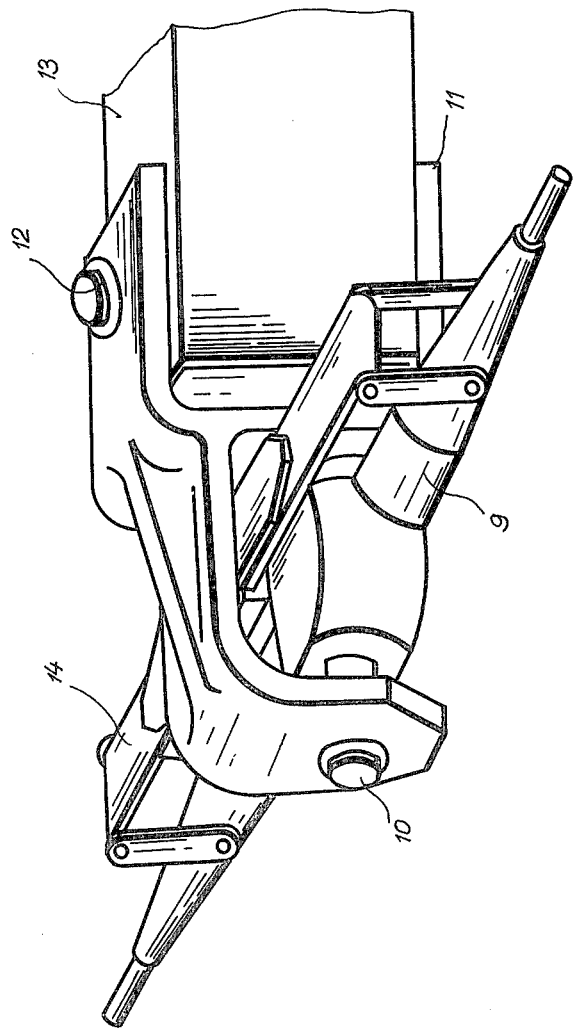
FIG. 4 illustrates a detail of the front suspension in a perspective view.

Journalled with one end to the implement holder 23 is further a lifting cylinder and piston unit 25, its other end being linked to the rear lifting arm 18. The axis of the longitudinal inclined pin 24 is directed towards the center of a lower connecting joint 33 of said lifting cylinder and piston unit 25, i.e., to the center of its pivotal connection with the implement holder 23. A rear abutment spring 26, preferably again a leaf spring, may be fitted between said rear transverse rod 21 and the implement holder 23. The main carrier 13 of the working unit 3 is pivoted to said implement holder 23 by means of a rear vertical connecting pin 27. At least one actuating cylinder and piston unit 28 is accomodated between said main carrier 13 and the implement holder 23, being pivoted to the main carrier 13 as well as to the implement holder 23. In order to relieve the actuating cylinder 28 during operation, a lock 29 can be provided between the main carrier 13 and the implement holder 23, said lock comprising for instance a locking pin 30 adapted for cooperation with locking holes 31. Hydraulic cylinder 25 is journaled at point 110 to implement holder 23. The hydraulic cylinder is further journaled at 112 to the rear lifting arms 18 of which there are two connected to each other as shown in FIGS. 1 and 2. The rear lifting arms 18 are joined at 114 to the turntable 16.

Figure 5:
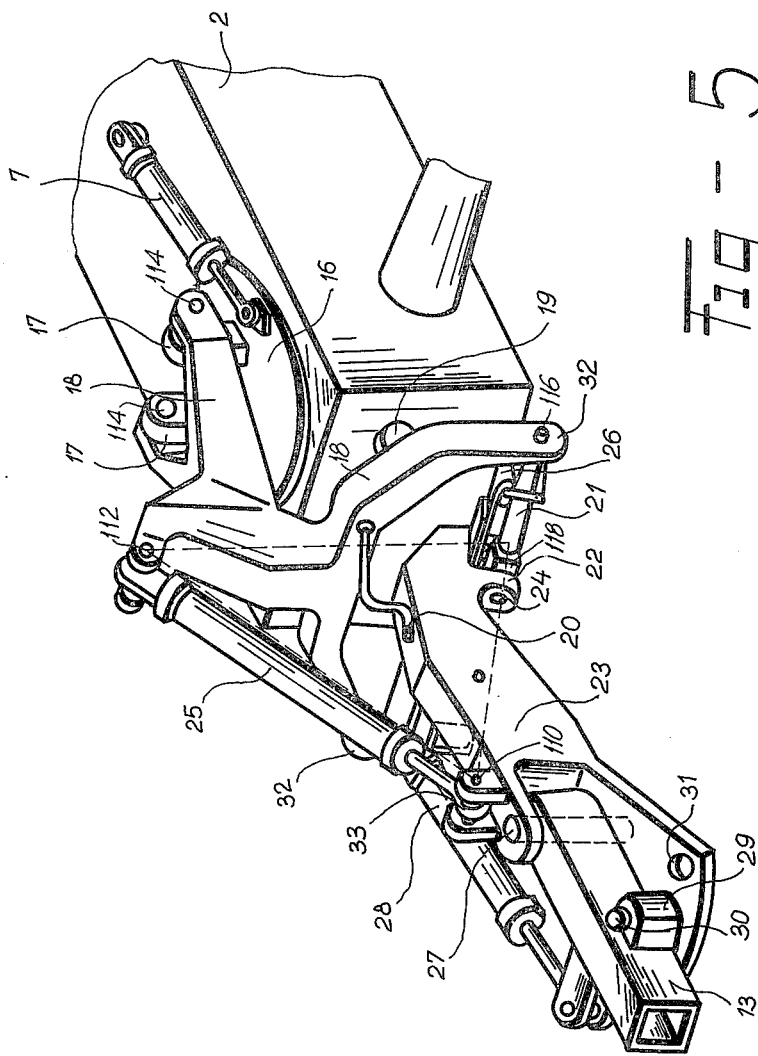
FIG. 5 represents in a similar view a detail of the rear suspension.

The lower bifurcated section 32 of the rear lifting arm 18 (FIG. 5) is journaled at points 116 and 118 to transverse rod 21 which in turn is pivotally mounted to the implement holder 23. With this arrangement, a theoretical triangle shown by the dotted lines connecting points 112, 110 and 118 is formed. When the hydraulic cylinder 25 is actuated to extend the piston, the length of side 110, 112 increases. As a result, the lower point 118 must move upwardly to form a new triangle as shown in FIG. 2. When this occurs, rear lifting arms 18 are moved upward along with bifurcated section 32 and implement holder 23.

The working aggregate according to the invention operates as follows:

In the transport position- in order to reduce the width of the profile as much as possible - the working aggregate is arranged in such a way that the front power unit 1 and the rear power unit 2 are in alignment and the main carrier 13 of the working unit 3 lies in the longitudinal axis of the aggregate. This arrangement is achieved by a suitable deflection of the turntable 16 by means of the control cylinders 7.

In this operation, the working unit 3 is lifted into its transport position by the front lifting arms 8 and the rear lifting arm 18, which latter is raised with the aid of the lifting cylinder 25. During travel, it is only the engine of the front power unit 1 which produces the traction force, the engine of the rear power unit 2 being out of action and allowed to run idly. In road bends, the steering of the entire aggregate may be assisted by swinging the turntable 16, so that the working unit 3 is deflected in relation to the rear power unit 2 to follow the curve of the road. The control of the entire working aggregate and its steering during transportation or work, when the engines of the front power unit 1 as well as of the rear power unit 2 are in operation, is effected by a single operator, namely the driver of the front power unit 1. Both power units 1 and 2 are connected for remote control, so that both may be controlled by the driver.

After its arrival on the working site, the aggregate is brought into working engagement on the one hand by turning the working unit 3 about the vertical connecting pin 27 by means of the actuating cylinder 28, and, on the other hand, by lowering the working unit 3 to its operative position with the aid of the front lifting arms 8 and the rear lifting arm 18, which is the opposite to the already described lifting of said working unit 3. The angle through which the working unit 3 was deflected, need not be changed during further operation. Its work having been finished, the working unit 3 is raised as described above and the entire working aggregate may be re-aligned into its transport position.

We claim:

1. A working aggregate for soil cultivation comprising in combination:
   a working unit for supporting tools vertically, and horizontally pivoted between two power units comprising:
   a. a front power unit,
   b. a rear power unit,
   c. said working unit supporting working tools,
   d. means for swingably mounting said working unit at one end thereof on the front power unit and means for swingably mounting said working unit at the other end thereof on the rear power unit so that the said working unit is suspended between the front and rear power units,
   e. first lifting means attached to the working unit and to the front power unit and second lifting means attached to the working unit and the rear power unit for lifting the working unit in relation to the front and rear power units into transport position and to lower the working unit into operative position, said second working means comprising a turntable mounted on the rear power unit, a rear lifting arm journalled to said turntable, a rear transverse rod mounted in said rear lifting arm and an implement holder attached to the said rear transverse rod and rotatably connected to the working unit,
   f. deflecting means attached to the working unit and to the rear power unit for positively deflecting the working unit in relation to the front and rear power units into axial alignment for transport purposes and out of alignment for operation.

2. Working aggregate as in claim 1, wherein at least one adjustable abutment is arranged between the rear lifting arm and the frame of the rear power unit.

3. Working aggregate as in claim 1, wherein a rear abutment spring is mounted between the rear transverse rod and the implement holder.

4. A working aggregate as in claim 1, wherein the turntable is connected by means of at least one control cylinder-and-piston unit to the rear power unit and is equipped with connecting eyelets by means of which it is journalled to the rear lifting arm which is provided with a bifurcation at its lower end, in which the rear transverse rod is secured.

5. A working aggregate as in claim 4, wherein a longitudinal inclined pin passes through the rear transverse rod, connecting said transverse rod to a rear yoke of the implement holder, a lifting cylinder-and-piston unit being mounted between said implement holder and the rear lifting arm, the axis of the longitudinal inclined pin passing through the center of the connecting joint, which joins the lower end of the lifting cylinder-and-piston unit to the implement holder.

6. A working aggregate as in claim 1, wherein the implement holder is connected by means of a vertical connecting pin to the main carrier of the working unit, at least one actuating cylinder-and-piston unit being pivoted between said implement holder and the main carrier.

7. A working aggregate as in claim 6, wherein a lock is provided between the implement holder and the main carrier to lock the main carrier in its position in relation to the implement holder.

8. Working aggregate as in claim 1, wherein the working unit is pivoted by means of its main carrier and a vertical front connecting pin to a front yoke which is pivotally attached by means of a longitudinal front pin to a transverse front lifting rod, mounted in the front lifting arms of the front power unit.

9. Working aggregate as in claim 8, wherein a balancing spring is mounted between the transverse front lifting rod and the front yoke.

* * * * *